(12) United States Patent
Ho

(10) Patent No.: US 7,836,565 B2
(45) Date of Patent: Nov. 23, 2010

(54) PANEL-FIXING DEVICE AND ELECTRONIC DEVICE APPLIED WITH THE SAME

(75) Inventor: Han-Kuang Ho, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 184 days.

(21) Appl. No.: 11/936,848

(22) Filed: Nov. 8, 2007

(65) Prior Publication Data

US 2008/0244872 A1 Oct. 9, 2008

(30) Foreign Application Priority Data

Mar. 29, 2007 (TW) .............................. 96111105 A

(51) Int. Cl.
*A44B 99/00* (2010.01)
*F16B 12/00* (2006.01)
(52) U.S. Cl. ........................... 24/528; 312/7.2; 348/836
(58) Field of Classification Search ............... 24/16 PB, 24/528, 457, 458, 535; 312/111, 140, 7.2; 348/836
See application file for complete search history.

(56) References Cited

U.S. PATENT DOCUMENTS 2,607,971 A * 8/1952 Bedford, Jr. .................. 52/713
4,236,280 A * 12/1980 Kreiseder .................. 24/16 PB
5,101,540 A * 4/1992 Roof et al. .................... 24/458
5,304,188 A * 4/1994 Marogil ....................... 606/157
5,414,904 A * 5/1995 Sampson .................. 24/16 PB
5,603,557 A * 2/1997 Marks et al. ............. 312/265.6
5,764,313 A * 6/1998 Schlatmann ................ 348/825
6,126,122 A * 10/2000 Ismert ....................... 248/74.1
7,380,692 B2 * 6/2008 Kostal et al. ................ 224/666
7,562,504 B2 * 7/2009 Herbst et al. ................... 52/461
2002/0000026 A1 * 1/2002 Noda .......................... 24/458

* cited by examiner

*Primary Examiner*—Victor Batson
*Assistant Examiner*—Michael Lee

(57) ABSTRACT

An electronic device includes a casing, a panel and at least one panel-fixing device. The panel-fixing device, which includes a receiving portion and a clipping portion, fixes the panel at the casing. The receiving portion disposed on the casing includes a plurality of positioning components. The clipping portion, which includes a hooking component, an adjusting component and a fixing plane, is movably engaged with the receiving portion. When the clipping portion is engaged with the receiving portion, the hooking component catches one of the positioning components for fixing the clipping portion. The adjusting component and the hooking portion are substantially parallel to each other. The fixing plane is substantially vertically connected to the adjusting component. When the clipping portion is engaged with the receiving portion, the fixing plane presses against the panel for fixing the panel to the casing.

25 Claims, 6 Drawing Sheets

PANEL-FIXING DEVICE AND ELECTRONIC DEVICE APPLIED WITH THE SAME

This application claims the benefit of Taiwan application Serial No. 096111105, filed Mar. 29, 2007, the subject matter of which is incorporated herein by reference.

BACKGROUND OF THE INVENTION

1. Field of the Invention

The invention relates in general to a panel-fixing device, and more particularly to the panel-fixing device for fixing a panel at a casing of an electronic device.

2. Description of the Related Art

Nowadays, the flat display has become an essential part of people's daily life, and widely applied to a liquid crystal display TV, a mobile phone, a desktop computer, a screen of the notebook, a screen of the personal digital assistant (PDA) and a screen of the voice recorder in the modern time.

Typically, the panel of the flat display is disposed on the front casing of the electronic device. In the traditional manufacturing process, the size of the casing is designed based on the panel size prospectively. If the front casing is designed and produced precisely based on the panel size, the panel can be fixed tightly at the front casing without shaking. However, comparing to the panels having the same size (ex: 17" panel), it has a considerable issue that the precise dimensions of panels would be slightly different from each other if those panels are fabricated by the different manufacturers and/or the manufacturing processes. Traditional method of solving the issue is reproducing and redesigning the matching casing based on the sizes of panels. In some traditional methods, some mechanical films with adequate size can be selected and added to the fixing component of the front casing for the purpose of fitting the panel into the front casing. However, these conventional methods require long labor hours and complicated manufacturing process, and therefore increase the manufacturing cost of panel production.

SUMMARY OF THE INVENTION

The invention is directed to a panel-fixing device and the electronic device applied with the same, and the panel can be fixed at adequate position and height using an adjustable and movable engaging design of the present invention. The objective of quick assembly and easy fabrication is therefore achieved according to the mechanical design of the present invention.

According to a first aspect of the present invention, a panel-fixing device is provided. The panel-fixing device for fixing a panel at a casing comprises a receiving portion and a clipping portion. The receiving portion disposed on the casing includes several positioning components. The clipping portion, which is movably engaged with the receiving portion, includes a hooking component, an adjusting component and a fixing plane. When the clipping portion is engaged with the receiving portion, the hooking component catches one of the positioning components for fixing the clipping portion. The adjusting component and the hooking component are substantially parallel to each other. The fixing plane is substantially vertically connected to the adjusting component. When the clipping portion is engaged with the receiving portion, the fixing plane presses against the panel for fixing the panel to the casing.

According to a second aspect of the present invention, an electronic device is provided. The electronic device includes a casing, a panel and at least one panel-fixing device. The panel-fixing device for fixing the panel at the casing comprises a receiving portion and a clipping portion. The receiving portion disposed on the casing includes several positioning components. The clipping portion, which is movably engaged with the receiving portion, includes a hooking component, an adjusting component and a fixing plane. When the clipping portion is engaged with the receiving portion, the hooking component catches one of the positioning components for fixing the clipping portion. The adjusting component and the hooking component are substantially parallel to each other. The fixing plane is substantially vertically connected to the adjusting component. When the clipping portion is engaged with the receiving portion, the fixing plane presses against the panel for fixing the panel to the casing.

The invention will become apparent from the following detailed description of the preferred but non-limiting embodiments. The following description is made with reference to the accompanying drawings.

DETAILED DESCRIPTION OF THE INVENTION

This invention is related to a panel-fixing device and an electronic device applied with the same. The panel-fixing device is designed as a movable engaged device. When the panels with slightly different sizes are assembled to a common casing, the panel-fixing device adjustably fixes those panels at its own suitable fixing position and height. The mechanical design of the present invention has several advantages such as quick assembly (i.e. saving assembly time), simplification of the manufacturing process (i.e. without fabricating different casing for those panels), and decrease of production cost (ex: a casing could be commonly used for fitting the panels having slightly different dimensions due to the novel panel-fixing device).

Figure 1A:
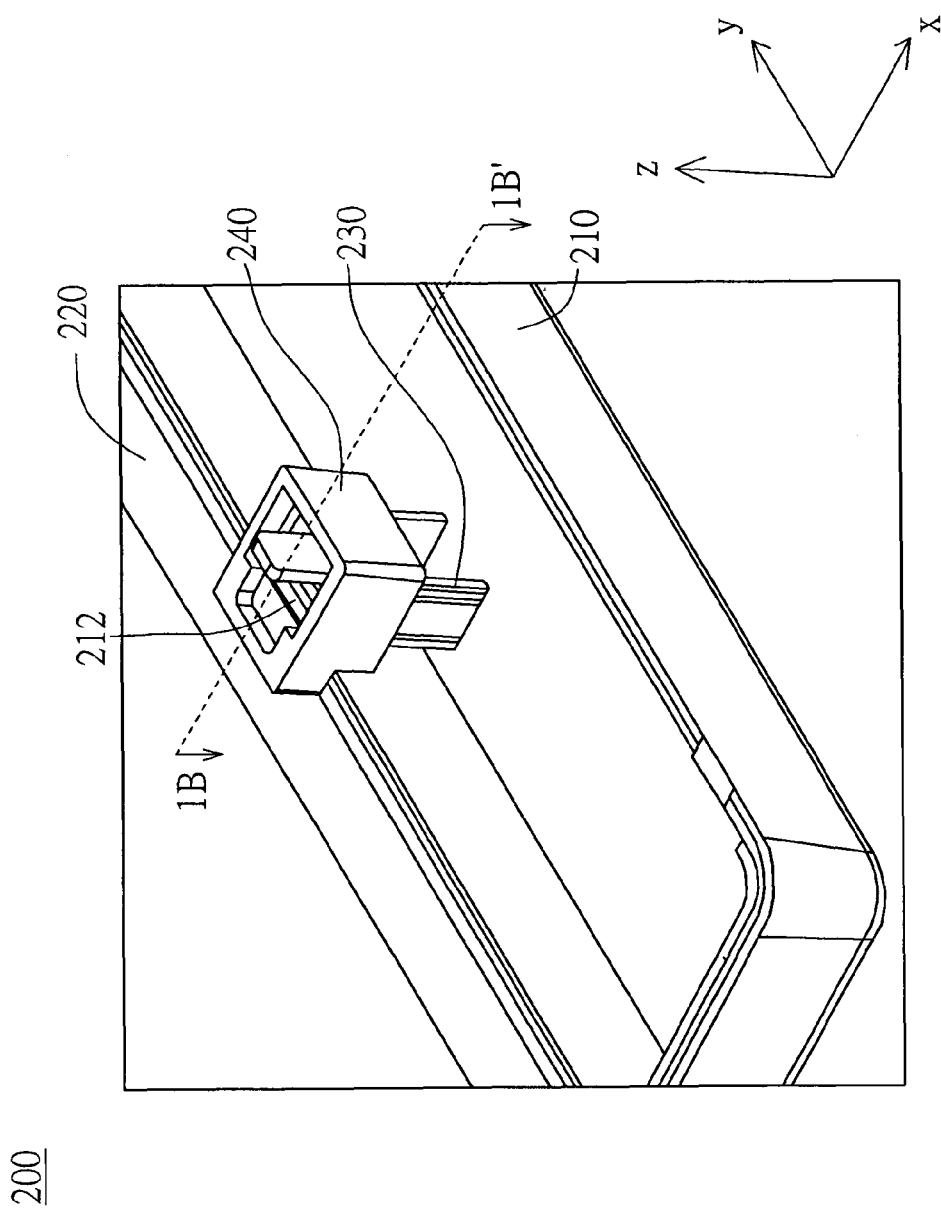
FIG. 1A shows a panel-fixing device assembled to an electronic device of the preferred embodiment according to the invention
Figure 1B:
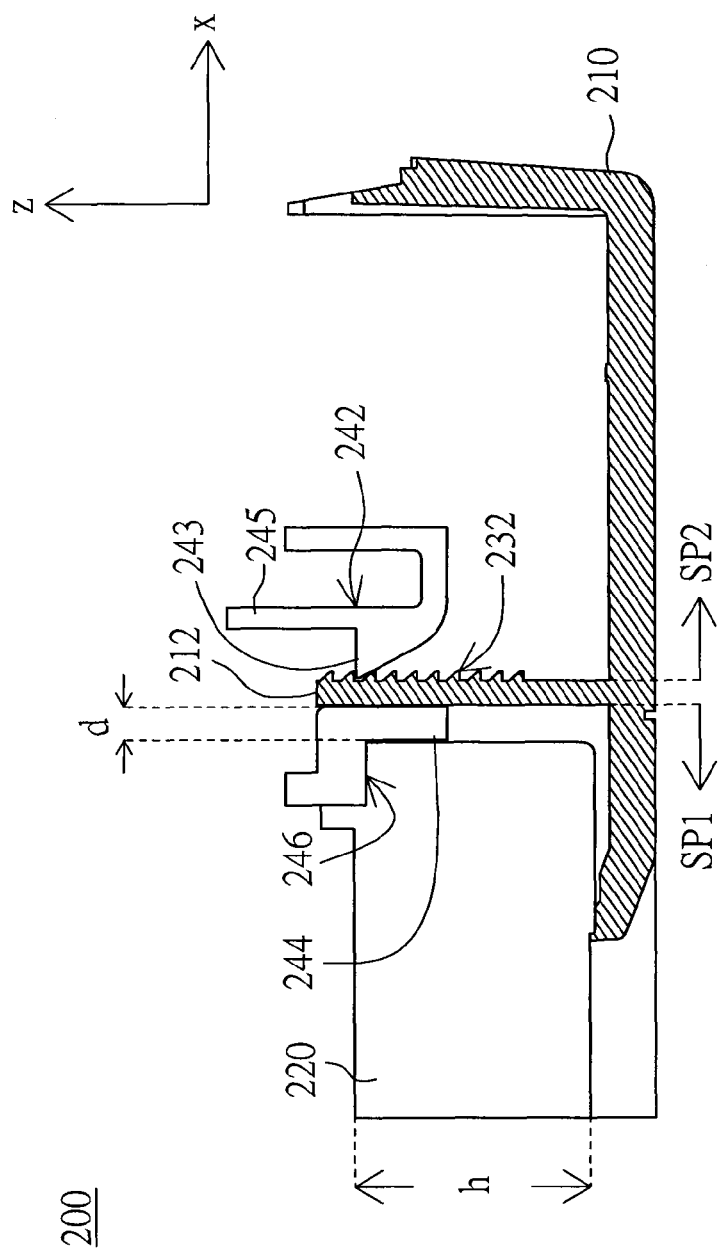
FIG. 1B is a cross-sectional view of the panel-fixing device assembled to the electronic device in FIG. 1A.

Please refer to FIG. 1A and FIG. 1B. FIG. 1A shows a panel-fixing device assembled to an electronic device of the preferred embodiment according to the invention. FIG. 1B is a cross-sectional view of the panel-fixing device assembled to the electronic device in FIG. 1A. The electronic device 200 includes a casing 210, a panel 220 and at least one panel-fixing device. Panel 220 is disposed on the casing 210. The panel-fixing device is used for fixing the panel 220 at the casing 210. The panel-fixing device includes a receiving portion 230 and a clipping portion 240. The receiving portion 230, which includes several positioning components 232, is disposed on the casing 210. The clipping portion 240, which is movable engaged with the receiving portion 230, includes a hooking component 242, an adjusting component 244 and a fixing plane 246. When the clipping portion 240 is engaged with the receiving portion 230, the hooking component 242 catches one of the positioning components 232 for fixing the clipping portion 240. The adjusting component 244 is substantially parallel to the hooking portion 242. The fixing plane 246 is substantially vertically connected to the adjusting component 244. When the clipping portion 240 is engaged with the receiving portion 230, the fixing plane 246 presses against the bottom surface of the panel 220 for fixing the panel 220 to the casing 210.

Figure 2A:
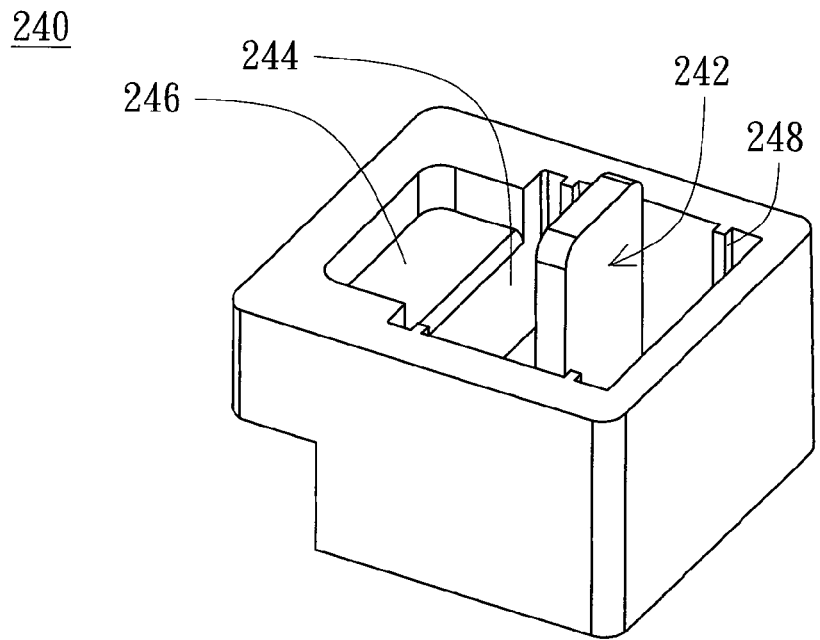
FIG. 2A is a perspective view of the clipping portion of the preferred embodiment according to the invention.
Figure 2B:
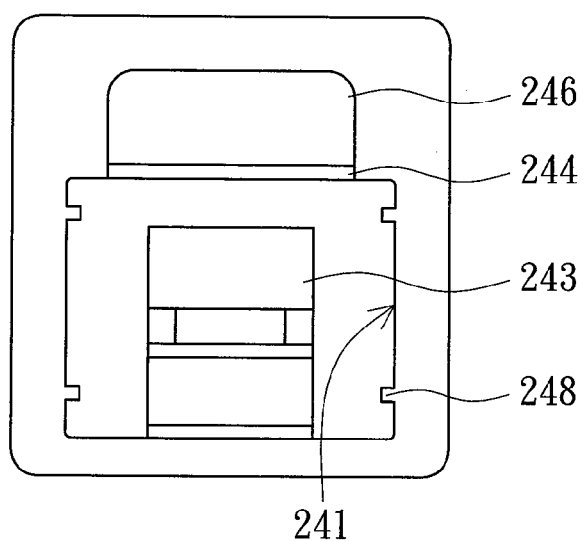
FIG. 2B is a top view of the clipping portion in FIG. 2A.
Figure 2C:
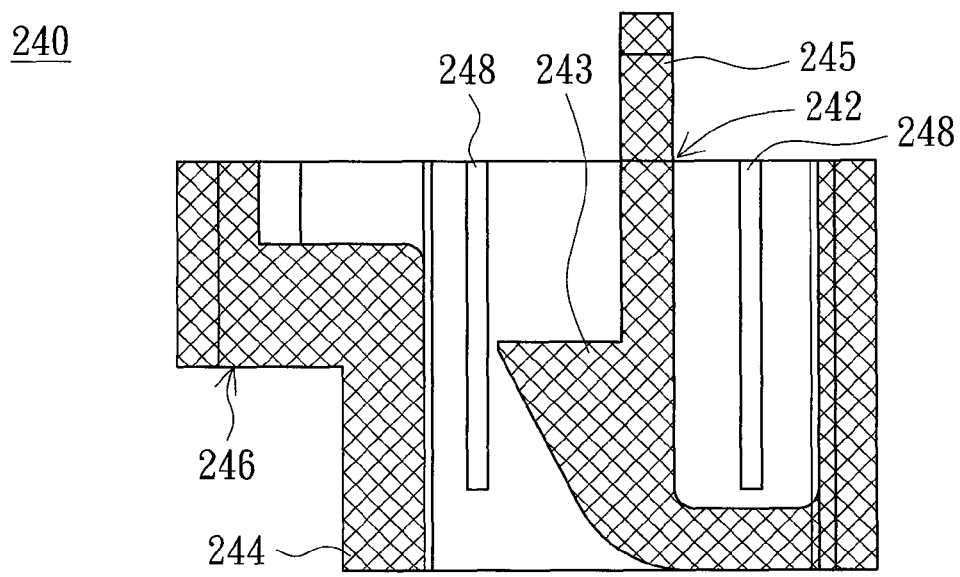
FIG. 2C is a cross-sectional view of the clipping portion in FIG. 2A.

Please refer to FIG. 2A to FIG. 2C. FIG. 2A is a perspective view of the clipping portion of the preferred embodiment according to the invention. FIG. 2B is a top view of the clipping portion in FIG. 2A. FIG. 2C is a cross-sectional view of the clipping portion in FIG. 2A. The panel-fixing device for fixing the panel 220 of the electronic device 200 at the casing 210 includes a receiving portion 230 and a clipping portion 240, wherein the clipping portion 240 is movably engaged with the receiving portion 230. As shown in FIG. 2A to FIG. 2C, the clipping portion 240 includes a hooking component 242, a fixing plane 246, an adjusting component 244 and several projecting ribs 248. The hooking component 242 includes a hooking plane 243 and an elastic handle 245 connected to the hooking plane 243. The adjusting component 244 and the hooking component 242 are substantially parallel to each other, and the fixing plane 246 is substantially vertically connected to the adjusting component 244. The clipping portion 240 includes several projecting ribs 248 which are substantially disposed on the inner side 241 of the clipping portion 240 vertically. In the practical manufacturing processes, the hooking component 242, the fixing plane 246, the adjusting component 244, and the projecting ribs 248 could be formed as one-piece structure (i.e. integrated as a whole) and made of an elastic material such as plastic.

Figure 3A:
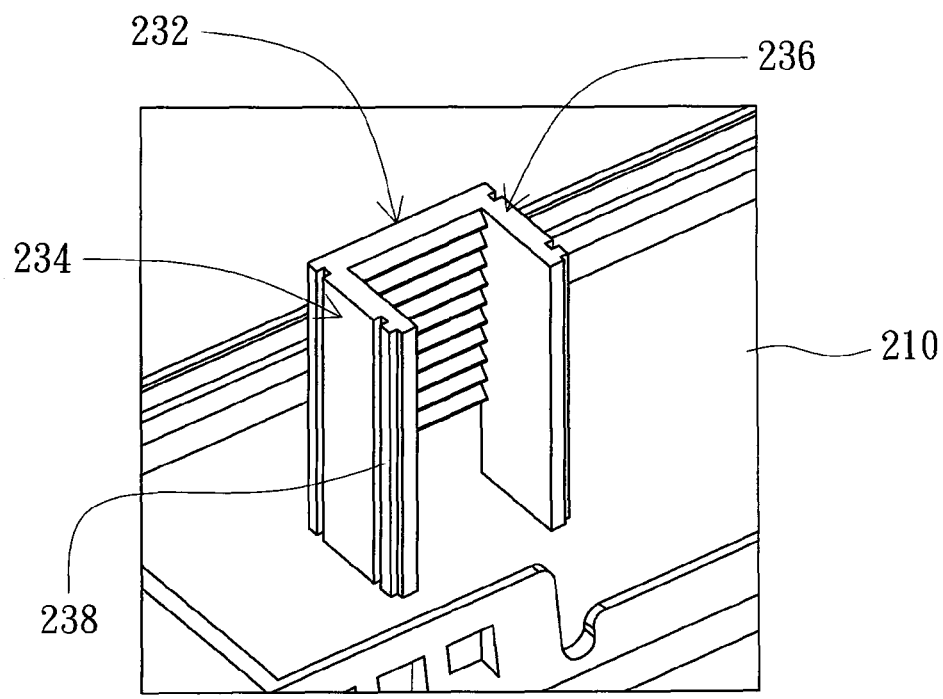
FIG. 3A shows the receiving portion disposed on the casing of the preferred embodiment according to the invention.
Figure 3B:
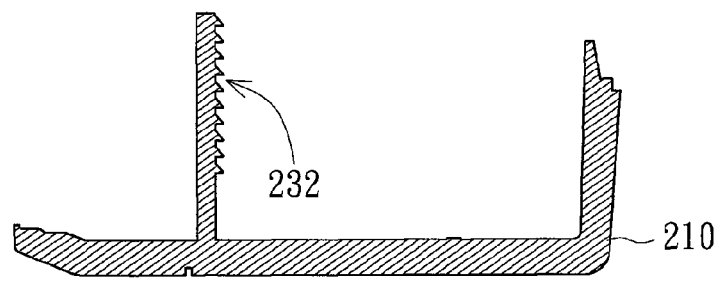
FIG. 3B is a cross-sectional view of the receiving portion disposed on the casing in FIG. 3A.

Please refer to FIG. 3A and FIG. 3B. FIG. 3A shows the receiving portion disposed on the casing of the preferred embodiment according to the invention. FIG. 3B is a cross-sectional view of the receiving portion disposed on the casing in FIG. 3A. The receiving portion 230, disposed on the casing 210, includes several positioning components 232, a first wall 234, a second wall 236 and several grooves 238. In the practical applications, the positioning components 232, the first wall 234, the second wall 236, several grooves 238 and the casing 210 could be formed as a one-piece structure. As shown in FIG. 3A, the first wall 234 is substantially parallel to the second wall 236. The positioning components 232 are disposed between the first wall 234 and the second wall 236, and the positioning components 232 are individually connected to the first wall 234 and the second wall 236. Also, the positioning components 232 are individually vertical to the first wall 234 and the second wall 236. In the embodiment, several hooking ribs are substantially parallel to the first and second walls 234/236 are exemplified as the positioning components 232. The grooves 238 are individually and substantially vertically formed on the outsides of the first wall 234 and the second wall 236.

Please refer to FIG. 1A and FIG. 1B again. When the clipping portion 240 and receiving portion 230 are engaged to each other, the clipping portion 240 is used for fixing the panel 220 at the casing 210. The casing 210 has an inner wall 212 for separating the casing 210 into a first space sp1 and a second space sp2 (see FIG. 1B). A first distance d is between the panel 220 and the inner wall 212, wherein a thickness of the adjusting component 244 is corresponding to the first distance d. While the adjusting component 244 is inserted between the panel 220 and the inner wall 212, the fixing plane 246 of the clipping portion 240 presses against the bottom surface of the panel 220. Then, the hooking plane 243 of the hooking component 242 catches one rib of positioning components 232, thereby fixing the panel 220 to the casing 210. After the clipping portion 240 is engaged with the receiving portion 230, the movement of the panel 220 in the x-direction is limited, since the thickness of the adjusting component 244 is corresponding to the first distanced d. Also, the fixing plane 246 pressing against the bottom surface of the panel 220 limits the movement of the panel 220 in the z-direction.

Thus, when the clipping portion 240 is engaged with the receiving portion 230, the hooking component 242 is positioned in the second space sp2, the adjusting component 244 located between the panel 220 and the inner side 212 is positioned in the first space sp1, and the fixing plane 246 which is against the panel 220 is positioned in the first space sp1 (see FIG. 1B). Furthermore, the clipping portion 240 and receiving portion 230 use an elastic handle 245 to achieve the objective of removable engagement. As shown in FIG. 1B, the elastic handle 245 of the hooking component 242 is connected to the hooking plane 243. When the elastic handle 245 is pushed by an external force, the hooking plane 243 is removed (apart) from the corresponding rib (i.e. corresponding positioning component 232), such that the clipping portion 240 is released from the receiving portion 230.

Furthermore, even the panels 220 of the same size could have different thickness h, and/or could have different first distance d (i.e. between the panel 220 and the inner wall 212 of FIG. 1B). In the practical application, if the panel thickness h varies (and an overall width of the panel along the x-direction not being changed), the same clipping portion 240 can be selected for fixing the panel by inserting the adjusting component 244 (whose the thickness is corresponding to the first distance d) into the space between the panel 220 and the inner wall 212 until the fixing plane 246 contacts the bottom surface of the panel 220. After complete insertion, the hooking component 242 of the clipping portion 240 is engaged with the positioning component 232 of the receiving portion 230. Therefore, the panel-fixing device of the invention is adjustable at different heights on the casing 210 for fixing the panels with different thickness h. If the size of the panel 220 varies (i.e., the overall width of the panel 220 in the x-direction varies), the first distance d between the panel 220 and the inner wall 212 will be changed (i.e. shortened or widened). Several clipping portions 240 having different thicknesses of the adjusting components 244 could be designed based on different first distance d for filling the different gaps between the panel 220 and casing 210. According to the present invention, whether or not the panel thickness h or the first distance d between the panel 220 and inner wall 212 varies, it is not necessary to redesign a new casing 210 for fixing the panel.

Figures 4A, 4B:
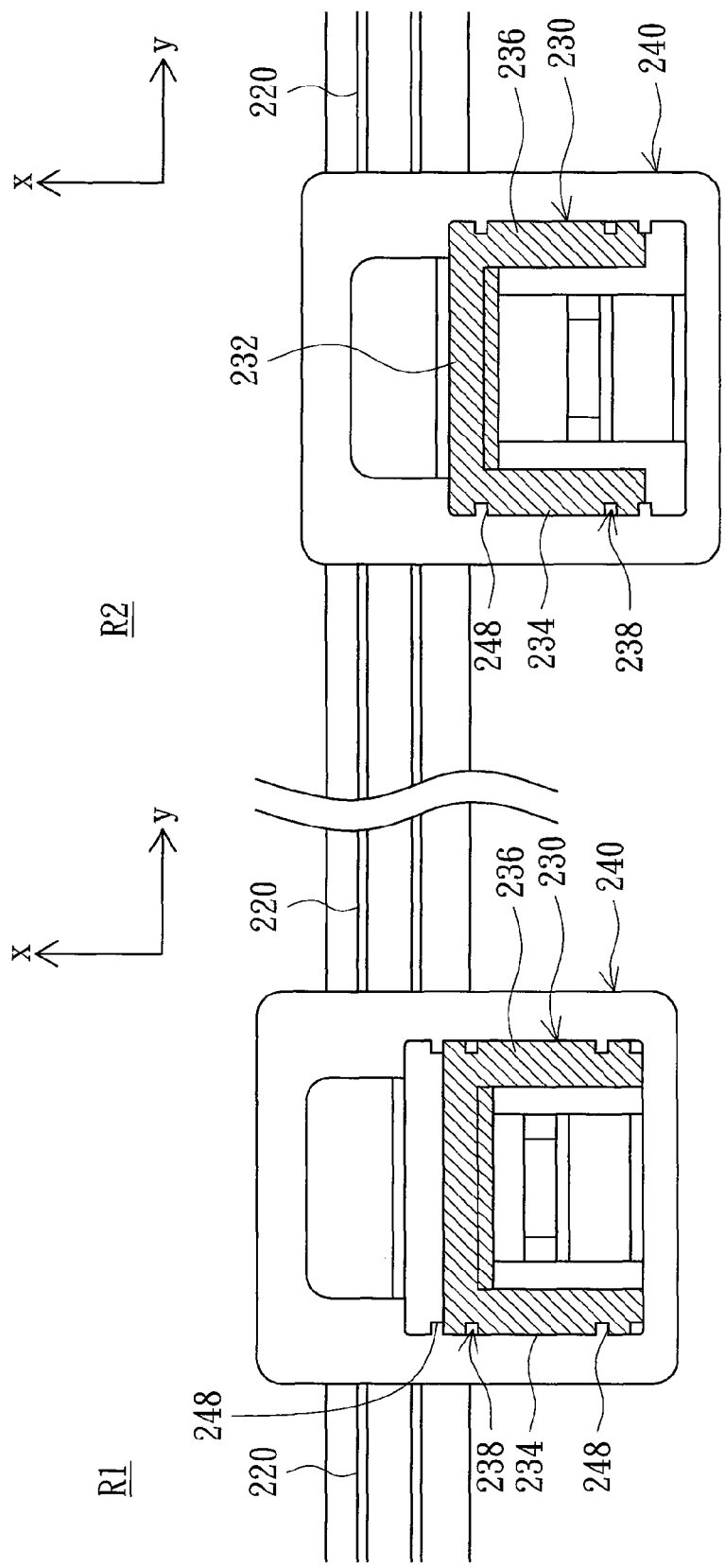
FIG. 4A shows a diagram of the clipping portion positioned in the first engaged position of the preferred embodiment according to the invention.
FIG. 4B shows a diagram of the clipping portion positioned in the second engaged position of the preferred embodiment according to the invention.

After selecting the proper thickness of the adjusting component 244 in accordance with the first distance d between the panel 220 and the inner wall 212, the setup can be fine adjusted through different engaged position of the clipping portion 240. According to the descriptions above, after the adequate clipping portion 240 is selected, the first distance d can be filled up by the adjusting component 244 with corresponding thickness. Besides, the clipping portion 240 can also be adjusted by positioning the clipping portion 240 in different engaged positions. Please refer to FIG. 4A and FIG. 4B. FIG. 4A shows a diagram of the clipping portion 240 positioned in the first engaged position of the preferred embodiment according to the invention. FIG. 4B shows a diagram of the clipping portion 240 positioned in the second engaged position of the preferred embodiment according to the invention. In this preferred embodiment, several grooves 238 are vertically disposed on the outsides of the first wall 234 and the second wall 236. The clipping portion 240 further includes several projecting ribs 248. When the clipping portion 240 is engaged with the receiving portion 230, the clipping portion 240 is selectively wedged with one or more grooves 238 through one or more projecting ribs 248 at the first engaged position R1 or the second engaged position R2.

Refer to FIG. 1B, FIG. 4A and FIG. 4B. When the thickness of the adjusting component 244 is less than the first distance d (for example, the overall width of the panel 220 along x-direction is too small, and the adjusting component 244 is not thick enough to fill the space denoted as first distance d of FIG. 1B), the clipping portion 240 could be engaged with the receiving portion 230 in the first engaged position R1. As shown in FIG. 4A, when the clipping portion 240 is engaged with the receiving portion 230 in the first engaged position R1, the adjusting component 244 positioned in first space sp1 is more far away from the second space sp2 and able to press against the side wall of the panel 220. On the contrary, when the thickness of the adjusting component 244 is larger than the first distance d (for example, the overall width of the panel 220 along x-direction is too large), the clipping portion 240 could be engaged with the receiving portion 230 in the second engaged position R2. As shown in FIG. 4B, when the clipping portion 240 is engaged with the receiving portion 230 in the second engaged position R2, the adjusting component 244 in the first space sp1 is closer to the second space sp2 and able to press against the side wall of the panel 220. Thus, when the first distance d between the panel 220 and inner side 212 is different from the thickness of the adjusting component 244 of the clipping portion 240, the positions of the clipping portion 240 along the x-direction could also be adjusted by changing the engaged positions (ex: choosing R1 or R2) of the clipping portion 240 through designs of the projecting ribs 248 and the grooves 238.

According the panel-fixing device and the electronic device applied with the same disclosed in the above embodiment of the invention, the clipping portion is adjustably engaged with the receiving portion. The panels with different thicknesses could be fixed to the same casing by adjusting the clipping depth of the clipping portion. Also, the panels with different sizes could be fixed to the same casing by selecting the adjusting component with an adequate thickness for filling up the empty space between the panel and the casing, or by changing the engaged positions of the clipping portion 240 and the receiving portion 230. Thus, the panel-fixing device of the present invention can save the assembly time, simplify the manufacturing process (i.e. without fabricating different casing for those panels), and decrease the production cost (ex: a casing could be commonly used for fitting the panels having slightly different dimensions due to the novel panel-fixing device). Of course, it is to be understood that the numbers of the panel-fixing device used for stably fixing a panel to its casing can be varied according to the practical applications, and the invention is not limited to only one panel-fixing device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A panel-fixing device, for fixing a panel at a casing, comprising:
    a receiving portion, disposed on the casing, comprising a plurality of positioning components formed on an inner wall of the casing; and
    a clipping portion, movably engaged with the receiving portion, comprising:
        a hooking component, catching one of the positioning components for fixing the clipping portion when the clipping portion is engaged with the receiving portion;
        an adjusting component, substantially parallel to the hooking component; and
        a fixing plane, substantially vertically connected to the adjusting component, wherein when the clipping portion is engaged with the receiving portion, the adjusting component inserts into a gap between the panel and the inner wall and the fixing plane presses against the panel for fixing the panel to the casing.

2. The panel-fixing device according to claim 1, wherein the inner wall is for separating the casing into a first space and a second space, the panel is disposed in the first space, and the positioning components of the receiving portion are formed on the inner wall and positioned in the second space.

3. The panel-fixing device according to claim 2, wherein when the clipping portion is engaged with the receiving portion, the hooking component is positioned in the second space and the adjusting component is positioned in the first space.

4. The panel-fixing device according to claim 2, wherein the receiving portion further comprises:
    a first wall and a second wall, which are oppositely disposed on the inner wall, wherein the positioning components are disposed between the first wall and the second wall.

5. The panel-fixing device according to claim 4, wherein the positioning components are a plurality of ribs which are substantially parallel to each other and dispose between the first wall and the second wall.

6. The panel-fixing device according to the claim 5, wherein the hooking component comprises:
    a hooking plane, when the clipping portion and the receiving portion are engaged, the hooking plane catches one of the ribs for fixing the clipping portion.

7. The panel-fixing device according to the claim 6, wherein the hooking component further comprises:
    an elastic handle, connected to the hooking plane, wherein when the elastic handle is pushed by an external force, the hooking plane is removed from the corresponding rib such that the clipping portion is released from the receiving portion.

8. The panel-fixing device according to claim 4, wherein a first distance is between the panel and the inner wall, and a thickness of the adjusting component is corresponding to the first distance.

9. The panel-fixing device according to claim 8, wherein the receiving portion further comprises a plurality of grooves formed on the outsides of the first wall and the second wall, the clipping portion further comprises a projecting rib, and the projecting rib is wedged into one of the grooves at one of a first engaged position and a second engaged position when the clipping portion is engaged with the receiving portion.

10. The panel-fixing device according to claim 9, wherein when the thickness of the adjusting component is less than the first distance, the clipping portion is engaged with the receiving portion in the first engaged position.

11. The panel-fixing device according to claim 9, wherein when the thickness of the adjusting component is larger than the first distance, the clipping portion is engaged with the receiving portion in the second engaged position.

12. The panel-fixing device according to claim 1, wherein the clipping portion is made of an elastic material.

13. The panel-fixing device according to claim 1, wherein the hooking component, the hooking plane and the adjusting component are integrated as a whole, and the receiving portion and the casing are integrated as a whole.

14. An electronic device, comprising:
a casing;
a panel; and
a panel-fixing device, for fixing the panel at the casing, comprising:
  a receiving portion, disposed on the casing, comprising a plurality of positioning components formed on an inner wall of the casing; and
  a clipping portion, movably engaged with the receiving portion, comprising:
    a hooking component, catching one of the positioning components for fixing the clipping portion when the clipping portion is engaged with the receiving portion;
    an adjusting component, substantially parallel to the hooking component; and
    a fixing plane, substantially vertically connected to the adjusting component, wherein the adjusting component inserts into a gap between the panel and the inner wall and the fixing plane presses against the panel for fixing the panel to the casing when the clipping portion is engaged with the receiving portion.

15. The electronic device according to claim 14, wherein the inner wall is for separating the casing into a first space and a second space, the panel is disposed in the first space, and the positioning components of the receiving portion are formed on the inner wall and positioned in the second space.

16. The electronic device according to claim 15, wherein when the clipping portion is engaged with the receiving portion, the hooking component is positioned in the second space, and the adjusting component is positioned in the first space.

17. The electronic device according to claim 15, wherein the receiving portion further comprises:
a first wall and a second wall, which are oppositely disposed on the inner wall, wherein the positioning components are disposed between the first wall and the second wall.

18. The electronic device according to claim 17, wherein the positioning components are a plurality of ribs which are substantially parallel to each other and disposed between the first wall and the second wall.

19. The electronic device according to the claim 18, wherein the hooking component comprises:
a hooking plane, when the clipping portion and the receiving portion are engaged, the hooking plane catches one of the ribs for fixing the clipping portion.

20. The electronic device according to the claim 19, wherein the hooking component further comprises:
an elastic handle connected to the hooking plane, wherein when the elastic handle is pushed by an external force, the hooking plane is removed from the corresponding rib such that the clipping portion is released from the receiving portion.

21. The electronic device according to claim 17, wherein a first distance is between the panel and the inner wall, and a thickness of the adjusting component is corresponding to the first distance.

22. The electronic device according to claim 21, wherein the receiving portion further comprises a plurality of grooves formed on the outsides of the first wall and the second wall, the clipping portion further comprises a projecting rib, and the projecting rib is wedged into one of the grooves at one of a first engaged position and a second engaged position when the clipping portion is engaged with the receiving portion.

23. The electronic device according to claim 22, wherein when the thickness of the adjusting component is less than the first distance, the clipping portion is engaged with the receiving portion in the first engaged position.

24. The electronic device according to claim 22, wherein when the thickness of the adjusting component is larger than the first distance, the clipping portion is engaged with the receiving portion in the second engaged position.

25. The electronic device according to claim 14, wherein the clipping portion is made of an elastic material.

* * * * *